(12) United States Patent
Boutboul

(10) Patent No.: US 7,372,851 B2
(45) Date of Patent: May 13, 2008

(54) METHOD AND SYSTEM FOR AUTOMATIC LANGUAGE NEGOTIATION ON VOICE (OVER IP) CALLS

(75) Inventor: Irwin Boutboul, Jersey City, NJ (US)

(73) Assignee: International Business Machines Corporation, Armonk, NY (US)

(*) Notice: Subject to any disclaimer, the term of this patent is extended or adjusted under 35 U.S.C. 154(b) by 44 days.

(21) Appl. No.: 11/427,119

(22) Filed: Jun. 28, 2006

(65) Prior Publication Data

US 2008/0056245 A1    Mar. 6, 2008

(51) Int. Cl.
*H04L 12/66* (2006.01)
(52) U.S. Cl. .................. 370/356; 370/255; 379/88.06
(58) Field of Classification Search ............ 370/255; 379/88.06, 221.06, 265.12, 266.08
See application file for complete search history.

(56) References Cited

U.S. PATENT DOCUMENTS

| | | | |
|---|---|---|---|
| 5,917,484 A * | 6/1999 | Mullaney ................. | 715/703 |
| 6,005,931 A * | 12/1999 | Neyman et al. ......... | 379/220.01 |
| 6,667,736 B1 * | 12/2003 | Bhansali et al. ......... | 345/171 |
| 6,879,349 B2 * | 4/2005 | Nishida et al. ......... | 348/553 |
| 6,956,867 B1 | 10/2005 | Suga | |
| 6,990,195 B1 | 1/2006 | LeBlanc et al. | |
| 7,006,614 B2 | 2/2006 | Feinberg et al. | |
| 2004/0199430 A1 * | 10/2004 | Hsieh ...................... | 705/26 |
| 2005/0005266 A1 * | 1/2005 | Datig ...................... | 717/136 |
| 2006/0184357 A1 * | 8/2006 | Ramsey et al. ........... | 704/9 |
| 2007/0112553 A1 * | 5/2007 | Jacobson ................. | 704/2 |

FOREIGN PATENT DOCUMENTS

WO    WO 2004030328 A1 *    4/2004

OTHER PUBLICATIONS

Biing-Hwang Juang, Automatic Recognition and Understanding of Spoken Language—A First Step Toward Natural Human-Machine Communication, IEEE Aug. 2000. vol. 88 No. 8.*
Yeshawant K. Muthusamy, Reviewing Automatic Language Identification. IEEE Oct. 1994.*

(Continued)

*Primary Examiner*—Beatriz Prieto
*Assistant Examiner*—Brandon M Renner
(74) *Attorney, Agent, or Firm*—Canton Colburn LLP; Derek Jennings

(57) ABSTRACT

A method for negotiating a common language on a voice over Internet Protocol (VoIP) network, the method comprising: allowing a plurality of users to connect to the VoIP network, each of the plurality of users having at least one of a plurality of VoIP compatible transmitting/receiving devices; configuring each of the plurality of VoIP compatible transmitting/receiving devices with a list of a plurality of languages, each of the plurality of languages having a priority level associated therewith; allowing automatic selection of the common language between two or more of the plurality of users on a joint VoIP call by performing a language handshake; computing a maximum selection score via a language handshake algorithm provided by the language handshake; maximizing a sum of priority levels; minimizing a sum of priority differences; and selecting the common language that provides a largest sum of the priority levels and a lowest sum of the priority differences.

7 Claims, 2 Drawing Sheets

OTHER PUBLICATIONS

Bond, Gregory W., et al, "An Open Architecture for Next-Generation Telecommunication Services", ACM Transactions on Internet Technology, vol. 4, No. 1, Feb. 2004, pp. 83-123.

Cogburn, Derrick L., "Going Global, Locally: The Socio-Technical Influences on Performance in Distributed Collaborative Learning Teams", Proceedings of SAICSIT 2002, pp. 52-64.

* cited by examiner

METHOD AND SYSTEM FOR AUTOMATIC LANGUAGE NEGOTIATION ON VOICE (OVER IP) CALLS

TRADEMARKS

IBM® is a registered trademark of International Business Machines Corporations, Armonk, New York, U.S.A. Other names used herein may be registered trademarks, trademarks or product names of International Business Machines Corporation or other companies.

BACKGROUND OF THE INVENTION

1. Field of the Invention

This invention relates to voice over IP (VoIP) calls, and particularly to a method for automatic language negotiation over VoIP.

2. Description of Background

The Internet spans the whole world and one may find a place to connect to the Internet at just about every location in the world. Today many websites are audio enabled. Voice over IP (Internet Protocol) uses an IP protocol to send audio between one or more computers in real time, so that users may converse.

Voice over Internet Protocol (VoIP), is a technology that allows a user to make telephone calls using a broadband Internet connection instead of a regular (or analog) phone line. Some services using VoIP may only allow a user to call other people using the same service, but others may allow a user to call anyone who has a telephone number including local, long distance, mobile, and international numbers. Also, while some services only work over a PC (Personal Computer) or a special VoIP phone, other services allow a user to use a traditional phone through an adaptor.

Basically, VoIP allows users to make telephone calls by logging onto a computer network, over a data network like the Internet. VoIP converts voice signals from a user's telephone into a digital signal that travels over the Internet and then converts the digital signal back at the other end so that the user is capable of speaking to any other user with a regular phone number. When a user places a VoIP call by using a phone with an adapter, the user hears a dial tone and dials in a regular manner just as the user always has. VoIP may also allow the user to make calls directly from a computer using a conventional telephone or a microphone.

In particular, depending on the service available, one way to place a VoIP call is to pick up a phone and dial the number by using an adaptor that connects to an existing high-speed Internet connection. The call goes through a local telephone company to a VoIP provider. The phone call goes over the Internet to the called party's local telephone company for the completion of the call. Another way is to utilize a microphone headset plugged into a computer. The number is placed using the keyboard and is routed through a cable modem. Therefore, a broadband (high speed Internet) connection is required. This can be through a cable modem, or high speed services such as DSL (Digital Subscriber Line) or a local area network (LAN). The user may hook up an inexpensive microphone to a computer and send voice data through a cable modem or connect a phone directly to a telephone adaptor.

With the increasing popularity and stability of VoIP, many applications are now integrating VoIP for advanced collaboration or communication between users around the world. In fact, with collaboration increasing worldwide, people are often lead to communicate with someone they do not even know prior to starting the communication.

With instant messaging, it has been widely accepted that English is a preferred way of communicating. Nowadays, many people around the world can adequately write and read English. However, it appears that many people around the world lack proper or sufficient English speaking abilities. Therefore, when two parties start instant messaging each other, English is assumed to be the first choice of language, especially on the Internet where most of the content is in English. In addition, some technical problems, such as keyboard layouts prevent people, whose native language is not English, from easily typing in other languages.

Nevertheless for voice communication, it is a totally different issue. First, there is a limited number of people around the world who can speak English as well as they read or write it simply because they only have a visual knowledge or practice of the English language. Second, keyboard limitations are not an issue over a telephone. Therefore, it cannot always be assumed that the first choice of language for communicating with another person is the English language.

As a result, in the VoIP world, there is a need to select a "best" language to use when two parties, who never communicated with each other before, to engage in a conversation. Since this system requires input (selection of languages) and output (visual output of "best" language to use), it can only be used on voice calls where there is an external data channel and user input/output. VoIP calls are a natural candidate for providing a solution, but any other kind of calls where data input/output are possible may apply.

Thus, it is well known that VoIP is an effective way of allowing people around the world to communicate. However, when two or more people want to communicate over VoIP and English is not their native language or preferred language of communication, there is not a way for such people to select a desired or "best" language of communication over VoIP. Therefore, it is desired to establish a method in which users around the world are capable of selecting a "best" language to use over VoIP.

SUMMARY OF THE INVENTION

The shortcomings of the prior art are overcome and additional advantages are provided through the provision of a method for negotiating a common language on a voice over Internet Protocol (VoIP) network, the method comprising: allowing a plurality of users to connect to the VoIP network, each of the plurality of users having at least one of a plurality of VoIP compatible transmitting/receiving devices; configuring each of the plurality of VoIP compatible transmitting/receiving devices with a list of a plurality of languages, each of the plurality of languages having a priority level associated therewith; allowing automatic selection of the common language between two or more of the plurality of users on a joint VoIP call by performing a language handshake; computing a maximum selection score via a language handshake algorithm provided by the language handshake; maximizing a sum of priority levels; minimizing a sum of priority differences; and selecting the common language that provides a largest sum of the priority levels and a lowest sum of the priority differences.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that allows one or more users to select a "best" language when communicating over a VoIP network.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
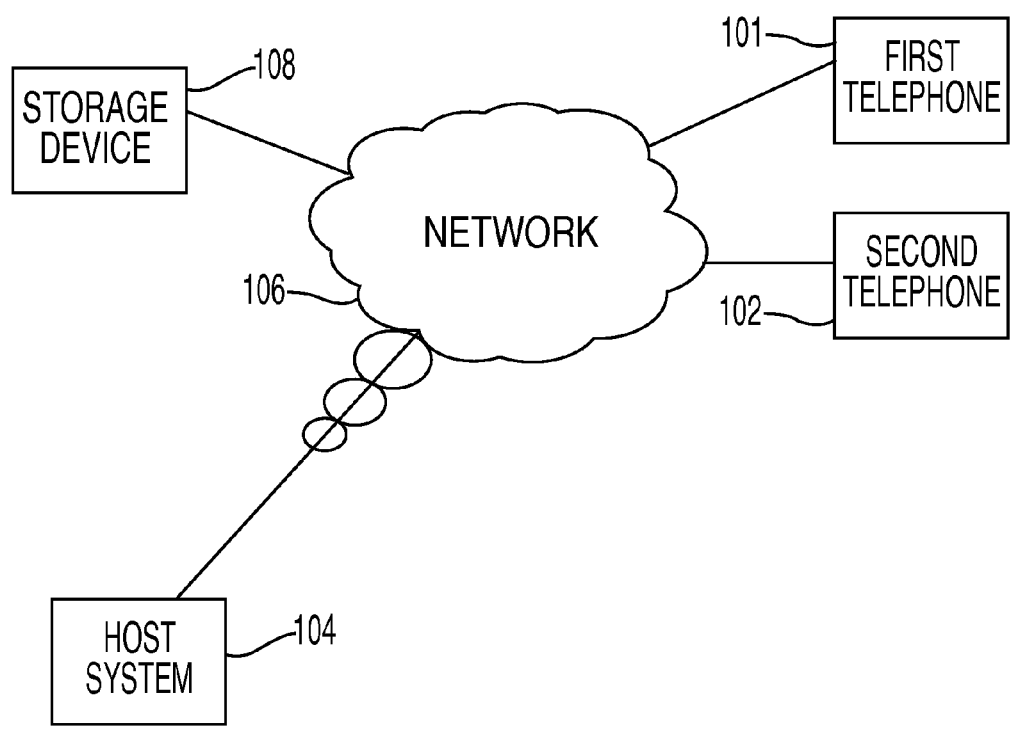
FIG. 1 illustrates one example of a voice over Internet Protocol (VoIP) network.

One aspect of the exemplary embodiments is a method for automatically selecting a "best" language when communicating over a VoIP network. Another aspect of the exemplary embodiments is a method for enabling a "language handshake" to facilitate a user in selecting the "best" language.

VoIP is a revolutionary technology that has the potential to completely rework the world's phone systems. VoIP providers have already been around for a little while and are growing steadily. Major carriers like AT&T are already setting up VoIP calling plans in several markets around the United States, and the FCC is looking seriously at the potential ramifications of VoIP service.

VoIP (Voice over Internet Protocol) is a method for talking analog audio signals, like the kind heard when a user speaks on the phone, and turning the analog signals into digital data that are transmitted over the Internet. VoIP is useful because VoIP can turn a standard Internet connection into a means of placing free phone calls. The practical upshot of this is that by using some of the free VoIP software that is available to make Internet phone calls, a user is bypassing the phone company (and its charges) entirely.

In particular, concerning telephone communications, packet voice systems accept analog voice signals from telephone handsets, digitize and compress the analog signal, placing the resulting series of bits into a short packet, send the packet over a network, and then decode and reconstruct the signal at the remote end. The packet network may be IP based, ATM (Asynchronous Transfer Mode) based, Frame Relay based, etc., thus leading to a variety of "voice over" technologies including VoIP, VoATM (Voice over Asynchronous Transfer Mode), VoDSL (Voice over Digital Subscriber Line), VoCable (Voice over Cable), and VoP (Voice over Phone). The exemplary embodiments focus on VoIP based technologies.

Concerning telephone technologies based on VoIP, IP phones perform digitization, compression, and packetization processes directly within the phone and send the resulting stream of packets over an Ethernet connection. IP gateways interface to analog or digital phones or to TDM (Time-Division Multiplexing) trunk systems and convert each voice signal to a VoIP packet stream. An IP PBX (Private Branch E(x)change) or Enterprise Gateway is often used by a telephone company to interface IP phones to a telephone network. Therefore, a Trunking Gateway is used within a phone company network to convert bulk telephone traffic to VoIP.

The interesting thing about VoIP is that there is not just one way to place a call. There are three different mechanisms of VoIP service in use. These mechanisms are an ATA mechanism, an IP phone mechanism, and a computer-to-computer mechanism.

Specifically, a simple way to place a call is via an ATA (Analog Telephone Adaptor). The ATA allows a user to connect a standard phone to a computer with an Internet connection for use with VoIP. The ATA is basically an analog-to-digital converter. The ATA receives an analog signal from a traditional phone and converts the analog signal into digital data for transmission over the Internet. Phone providers are bundling ATAs free with their service. In fact, a user simply cracks the ATA out of the box, plug the cable to a phone that would normally go in the wall socket into the ATA, and the user is ready to make VoIP calls. Some ATAs may ship with additional software that is loaded onto a host computer to configure it. However, this is a simple and quick setup.

In particular, IP phones are specialized phones that resemble normal phones with a handset, cradle, and buttons. However, instead of having the standard RJ-11 phone connectors, IP phones have an RJ-45 Ethernet connector. IP phones connect directly to a router and have all the hardware and software necessary right onboard to handle the IP call. Once Wi-Fi IP phones are available, they may allow subscribing callers to male VoIP calls from any Wi-Fi hot spot.

In particular, computer-to-computer is a simple way to use VoIP. A user does not need to pay for long-distance calls. There are several companies offering free or very low-cost software that a user can use for this type of VoIP. All a user is required to have is the software, a microphone, speakers, a sound card, and an Internet connection, preferably a fast one through a cable or DSL modem. Apart from a normal monthly ISP (Internet Service Provider) fee, there is usually no charge for computer-to-computer calls, no matter the distance.

As a result, phone companies use VoIP to streamline their networks via one of the mechanisms described above. By routing thousands of phone calls through a circuit switch and into an IP gateway, phone companies reduce the bandwidth they're using for the long haul. Once the call is received by a gateway on the other side of the call, it is decompressed, reassembled, and routed to a local circuit switch. Although it takes some time, eventually all of the current circuit-switched networks are going to be replaced with packet-switching technology.

Consequently, with VoIP, a user can make a call from anywhere in the world as long as broadband connectivity is available. Since the IP phones or ATAs broadcast their info over the Internet, the provider can administer them anywhere there is a connection. So business travelers can take their phones or ATAs with them on trips and always have access to their home phone. However, another alternative is the softphone. A softphone is client software that loads the VoIP service onto a desktop or laptop. Thus, VoIP technology is very useful, especially for people who travel and work in other countries and are required to communicate with people from these countries in order to conduct business. In our global economy, English is not always the preferred or desired method of communication between traveling individuals.

In FIG. 1, a block diagram of an exemplary system for negotiating a common language on a VoIP is generally shown. The system includes one or more telephones 101, 102 through which users at one or more geographic locations contact the host system 104. The host system 104 executes a VoIP program and the telephones 101, 102 are coupled to the host system 104 via a network 106. Each telephone 101, 102 is implemented using a general-purpose computer executing a computer program for carrying out the processes described herein.

The network 106 may be any type of known network including, but not limited to, a wide area network (WAN), a local area network (LAN), a global network (e.g., Internet), a virtual private network (VPN), and an intranet. The network 106 may be implemented using a wireless network or any kind of physical network implementation known in the art. Telephones 101, 102 may be coupled to the host system through multiple networks (e.g., intranet and Internet) so that not all telephones 101, 102 are coupled to the host system 104 through the same network. One or more of the telephones 101, 102 and the host system 104 may be connected to the network 106 in a wireless fashion. In one embodiment, the network is the Internet and one or more telephones 101, 102 execute a user interface application (e.g., a web browser) to contact the host system 104 through the network 106 while another telephones 101, 102 is directly connected to the host system 104.

The storage device 108 is implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. Information stored in the storage device 108 is retrieved and manipulated via the host system 104. The storage device 108 may also include other kinds of data such as information concerning the updating of the link database (e.g., a user identifier, date, and time of update).

The host system 104 depicted in FIG. 1 is implemented using one or more servers operating in response to a computer program stored in a storage medium accessible by the server. The host system 104 operates as a network server (e.g., a web server) to communicate with the telephones 101, 102. The host system 104 handles sending and receiving information to and from the telephones 101, 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software as is known in the art.

The host system 104 may also operate as an application server. The host system 104 executes one or more computer programs to perform VoIP building functions. Processing may be shared by the telephones 101, 102 and the host system 104 by providing an application (e.g., java applet) to the telephones 101, 102. Alternatively, the telephones 101, 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

To date there is no VoIP function that allows one or more users to select a desired language or "best" language in which to make the phone calls over the VoIP network. The exemplary embodiments demonstrate a method of allowing users to automatically select such desired language to communicate in. The VoIP system of the exemplary embodiments includes one or more user systems through which users at one or more geographic locations contact the host system. The host system executes the VoIP software and the user systems are coupled to the host system via a VoIP network.

This language selection has to be transparent and automatic for the end user. Furthermore, it has to allow for adaptive language, so that even if parties A & B used to speak in language L1 at time T, parties A & B could use another language L2 at another time, depending on the needs of parties A & B. For example, if person A wants to improve his/her Chinese speaking abilities, he/she could have the VoIP system give a higher importance to Chinese when establishing a communication, even though Chinese might not naturally be the best selection of language (proficiency-wise). However, this would allow for natural language improvement and practice by using an adaptive VoIP system.

In the exemplary embodiments, each user has a configurable list of languages and associated levels of priority. For example, user A could have {English—10, French—8, Spanish—7} and user B {Chinese—10, Spanish—6, English—3}. During the VoIP call initiation, there will be a "language handshake," which will find the best language by selecting the common language L from A and B that has a maximum selection score. A selection score algorithm attempts to maximize a sum of the priorities, while minimizing the difference of priorities. In the example above, both English and Spanish have a total priority of 13. However English has a priority difference of 7 (10−3=7) and Spanish 1 (7−6=1). In that case, it makes more sense to use Spanish for both parties to understand and communicate with each other.

If no common language is found between A & B, no selection is made or a default selection is chosen. Once the selection is made, both parties receive visual output on their portable device (laptop, cell phone, etc.) of the best language to use, and are able to start a conversation or communication right away by using this language without spending time figuring out who speaks which language.

This selection mechanism can be extended to phone calls with more than two parties, by changing the selection algorithm accordingly (i.e., by maximize the sum of the priorities while minimizing the differences). As people join or leave a call, the best language selection is automatically readjusted each time. Thus, the language selection mechanism operates dynamically with changing conditions. For example many calls have three people including two of the same origins and a third of a "foreign origin." When the third person leaves, the VoIP system of the first two users automatically switched to their native, preferred or desired language. If another uses then wished to enter in on the phone conversation of these two users, then the VoIP system may be automatically switched to take into account the language preferences of the new user entering into a call.

Figure 2:
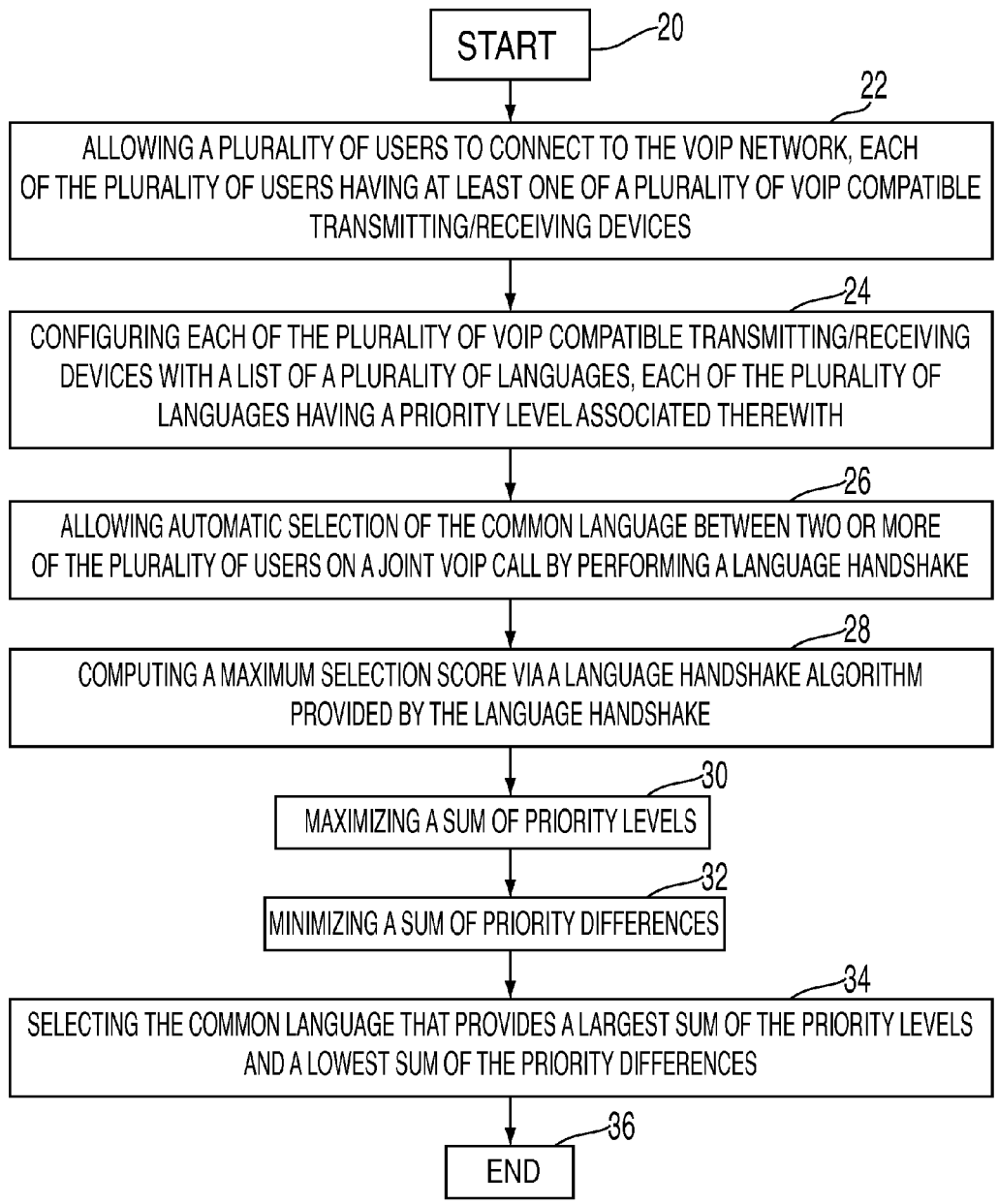
FIG. 2 illustrates one example of a flowchart illustrating selecting a common language on a voice over Internet Protocol (VoIP) network.

Specifically, referring to FIG. 2, one example of a flow-chart illustrating selecting a common language on a voice over Internet Protocol (VoIP) network is presented. At step 20 the selection process commences when a user desires to make a call. At step 22 a plurality of users is permitted to connect to the VoIP network, each of the plurality of users having at least one of a plurality of VoIP compatible transmitting/receiving devices. At step 24 each of the plurality of VoIP compatible transmitting/receiving devices is configured with a list of a plurality of languages, each of the plurality of languages having a priority level associated therewith. At step 26 automatic selection of the common language between two or more of the plurality of users on a joint VoIP call is permitted by performing a language handshake. At step 28 a maximum selection score is computed via a language handshake algorithm provided by the language handshake. At step 30 a sum of priority levels is maximized. At step 32 a sum of priority differences is minimized. At step 34 the common language that provides a largest sum of the priority levels and a lowest sum of the priority differences is selected by the VoIP system. At step 36 the selection process is terminated.

Therefore, the advantages of the exemplary embodiments are that (1) the VoIP system automatically selects a "best" language to use on a voice conversation between two or more parties, (2) since the VoIP system requires input (selection of languages) and output (visual output of best language to use), the VoIP system can only be used on voice calls where there is an external data channel and user input/output, and (3) during the VoIP call initiation, there is a 'language handshake,' which finds the "best" language by selecting a common language L from A and B which has the maximum selection score. Of course, the users are permitted to select any language they desire even if the maximum selection score is low. This gives the users the opportunity to practice their language skills by communicating with another person in a language that they have been The advantages of using VoIP technology are that VoIP uses the Internet's packet-switching capabilities to provide phone service. VoIP has several advantages over circuit switching. For example, packet switching allows several telephone calls to occupy the amount of space occupied by only one in a circuit-switched network. Using PSTN (Public Switched Telephone Network), a 10-minute phone call consumes 10 full minutes of transmission time at a cost of 128 Kbps. In contrast, with VoIP, that same call may have occupied only 3.5 minutes of transmission time at a cost of 64 Kbps, leaving another 64 Kbps free for those 3.5 minutes, plus an additional 128 Kbps for the remaining 6.5 minutes. Based on this simple estimate, another three or four calls could easily fit into the space used by a single call under a conventional telephone system. In addition, this example doesn't even factor in the use of data compression, which further reduces the size of each call.

In addition, VoIP facilitates tasks that may be more difficult to achieve using traditional phone networks. For instance, incoming phone calls can be automatically routed to a user's VoIP phone, regardless of where the user connected to a network. Therefore, if a user takes a VoIP phone on a trip, anywhere the user connects to the Internet, the user can receive incoming calls. Also, free phone numbers for use with VoIP are available in the USA, UK and other countries.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for negotiating a common language on a voice over Internet Protocol (VoIP) network, the method comprising:
    allowing a plurality of users to connect to the VoIP network, each of the plurality of users having at least one of a plurality of VoIP compatible transmitting/receiving devices;
    configuring each of the plurality of VoIP compatible transmitting/receiving devices with a list of a plurality of languages, each of the plurality of languages having a priority level associated therewith;
    allowing automatic selection of the common language between two or more of the plurality of users on a joint VoIP call by performing a language handshake;
    computing a maximum selection score via a language handshake algorithm provided by the language handshake;
    maximizing a sum of priority levels;
    minimizing a sum of priority differences; and
    selecting the common language that provides a largest sum of the sum of priority levels and a lowest sum of the sum of priority differences.

2. The method of claim 1, wherein each of the plurality of VoIP compatible transmitting/receiving devices includes a visual output.

3. The method of claim 2, wherein the visual output displays the common language selected by the language handshake algorithm.

4. The method of claim 1, wherein a user of a VoIP compatible transmitting/receiving device determines the priority level associated with each of the plurality of languages in the list.

5. The method of claim 1, wherein if the selecting step is unable to detect the common language, then the VoIP network selects a default language.

6. The method of claim 1, wherein the language handshake algorithm re-computes the maximum selection score each time one or more users of the plurality of users enters or dismisses the joint VoIP call.

7. The method of claim 1, wherein one or more users of the plurality of users on the joint VoIP call is permitted to select a different language than the common language selected by the selection score algorithm via determination of the maximum selection score.

* * * * *